(12) United States Patent
Meister-Place (10) Patent No.: US 10,661,210 B2
(45) Date of Patent: May 26, 2020

(54) OIL SEPARATOR INCLUDING SPIRAL MEMBERS DEFINING HELICAL FLOW PATHS

(71) Applicant: Miniature Precision Components, Inc., Walworth, WI (US)

(72) Inventor: Brandon Meister-Place, Allis, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 564 days.

(21) Appl. No.: 15/264,899

(22) Filed: Sep. 14, 2016

(65) Prior Publication Data

US 2017/0072352 A1    Mar. 16, 2017

Related U.S. Application Data

(60) Provisional application No. 62/218,608, filed on Sep. 15, 2015.

(51) Int. Cl.
*B01D 45/08* (2006.01)
*B01D 45/04* (2006.01)
(Continued)

(52) U.S. Cl.
CPC ............ *B01D 45/08* (2013.01); *B01D 45/04* (2013.01); *B01D 45/12* (2013.01); *B01D 45/16* (2013.01);
(Continued)

(58) Field of Classification Search
CPC ............... B01D 45/08; B01D 46/0036; B01D 46/0031; B01D 50/002; B01D 2279/60;
(Continued)

(56) References Cited

U.S. PATENT DOCUMENTS

| 2,193,209 A | * | 3/1940 | Sandberg | ............... | B01D 45/16 55/355 |
| 2,271,642 A | * | 2/1942 | Holzwarth | ............. | B01D 45/16 261/DIG. 54 |

(Continued)

FOREIGN PATENT DOCUMENTS

| DE | 20302824 U1 | 7/2004 |
| JP | 2014125929 A | 7/2014 |

(Continued)

OTHER PUBLICATIONS

Extended European Search Report dated May 15, 2019 in corresponding European Patent Application No. 18214132.5.

*Primary Examiner* — Dung H Bui
(74) *Attorney, Agent, or Firm* — Dickinson Wright PLLC (57) ABSTRACT

An oil separator including a housing that is separated by a partition assembly. The partition assembly includes a plurality of channels that each extend between a first opening and a second opening for passing oil-laden gases therethrough. A plurality of spiral members are each disposed in one of the channels, each define a helical flow path for guiding the oil-laden gases in the helical flow path about the spiral member to separate the oil from the oil-laden gases. One or more valves may be connected to at least one of the openings of the channels. The valves may be moveable in response to a predetermined pressure being applied against the valve. A fine mist separator assembly may include includes a fibrous pad disposed adjacent to and in alignment with the second openings for absorbing oil after the oil-laden gases have passed through the frames.

20 Claims, 8 Drawing Sheets

(51) Int. Cl.
  *B01D 50/00* (2006.01)
  *F01M 13/04* (2006.01)
  *B01D 46/00* (2006.01)
  *B01D 45/16* (2006.01)
  *B01D 45/12* (2006.01)

(52) U.S. Cl.
  CPC ....... *B01D 46/0031* (2013.01); *B01D 50/002* (2013.01); *F01M 13/04* (2013.01); *B01D 2279/60* (2013.01); *F01M 2013/0427* (2013.01)

(58) Field of Classification Search
  CPC ........ B01D 45/16; B01D 45/12; F01M 13/04; F01M 2013/0433; F01M 2013/0427; F01M 2013/0072; F01M 2013/0422; F02M 25/06
  See application file for complete search history.

(56) References Cited

U.S. PATENT DOCUMENTS

| | | | | |
|---|---|---|---|---|
| 2,538,195 | A * | 1/1951 | Henkel | B01D 45/08 55/450 |
| 3,386,588 | A * | 6/1968 | Ades | B04C 5/28 209/728 |
| 3,398,513 | A * | 8/1968 | Thompson | B01D 47/02 55/449 |
| 3,611,679 | A * | 10/1971 | Pall | B01D 45/16 55/457 |
| 3,895,930 | A * | 7/1975 | Campolong | B01D 45/16 55/394 |
| 4,537,608 | A * | 8/1985 | Koslow | B01D 50/002 55/337 |
| 4,666,476 | A | 5/1987 | Reeve et al. | |
| 4,723,529 | A | 2/1988 | Yokoi et al. | |
| 4,746,340 | A * | 5/1988 | Durre | B01D 45/12 55/347 |
| 4,966,703 | A * | 10/1990 | Kalnins | B01D 17/0217 210/512.1 |
| 5,024,203 | A | 6/1991 | Hill | |
| 5,113,671 | A * | 5/1992 | Westermeyer | F25B 43/02 55/337 |
| 5,129,371 | A | 7/1992 | Rosalik, Jr. | |
| 5,269,949 | A * | 12/1993 | Tuszko | B01D 45/12 209/716 |
| 5,323,740 | A | 6/1994 | Daily et al. | |
| 5,404,730 | A | 4/1995 | Westermeyer | |
| 5,450,835 | A | 9/1995 | Wagner | |
| 5,579,744 | A | 12/1996 | Trefz | |
| 5,617,834 | A | 4/1997 | Lohr | |
| 6,279,556 | B1 | 8/2001 | Busen et al. | |
| 6,293,268 | B1 | 9/2001 | Mammarella | |
| 6,626,163 | B1 | 9/2003 | Busen et al. | |
| 6,860,915 | B2 | 3/2005 | Stegmaier et al. | |
| 7,007,682 | B2 | 3/2006 | Takahashi et al. | |
| 7,140,358 | B1 | 11/2006 | Shieh | |
| 7,246,612 | B2 | 7/2007 | Shieh et al. | |
| 7,422,612 | B2 | 9/2008 | Pietschner | |
| 7,604,676 | B2 | 10/2009 | Braziunas | |
| 7,637,978 | B2 * | 12/2009 | Jung | F02M 35/022 55/396 |
| 7,743,742 | B2 * | 6/2010 | Wagner | B01D 45/16 123/41.86 |
| 7,828,865 | B2 * | 11/2010 | Hodges | B01D 45/08 55/318 |
| 7,850,754 | B2 * | 12/2010 | Ruppel | F01M 13/04 55/315 |
| 7,896,946 | B1 * | 3/2011 | Steffen | B01D 45/08 55/420 |
| 7,992,551 | B2 | 8/2011 | Shieh | |
| 8,047,186 | B2 | 11/2011 | Shieh et al. | |
| 8,297,264 | B2 * | 10/2012 | Imhof | F01M 13/0011 123/574 |
| 8,555,827 | B2 | 10/2013 | Schleiden | |
| 8,714,132 | B2 | 5/2014 | Baumann et al. | |
| 9,074,558 | B2 | 7/2015 | Roelver | |
| 2007/0281205 | A1 | 12/2007 | Wagner et al. | |
| 2008/0006250 | A1 * | 1/2008 | Bula | B01D 45/04 123/559.1 |
| 2008/0028940 | A1 * | 2/2008 | Han | B01D 45/16 96/417 |
| 2008/0105494 | A1 * | 5/2008 | Lemke | F01M 13/0011 184/6.23 |
| 2008/0155949 | A1 * | 7/2008 | Dunsch | B01D 45/08 55/456 |
| 2008/0209869 | A1 * | 9/2008 | Rother | B01D 45/16 55/337 |
| 2009/0100811 | A1 * | 4/2009 | Scheckel | B01D 45/08 55/448 |
| 2009/0199826 | A1 * | 8/2009 | Meinig | B01D 45/08 123/573 |
| 2009/0211454 | A1 * | 8/2009 | Grafl | B01D 45/00 96/188 |
| 2010/0126479 | A1 | 5/2010 | Shieh et al. | |
| 2010/0180854 | A1 | 7/2010 | Baumann et al. | |
| 2011/0023429 | A1 * | 2/2011 | Janakiraman | B01D 45/08 55/434 |
| 2011/0030629 | A1 * | 2/2011 | Schleiden | B01D 45/08 123/41.86 |
| 2011/0146639 | A1 | 6/2011 | Martinengo et al. | |
| 2011/0179755 | A1 * | 7/2011 | Gruhler | B29C 65/58 55/320 |
| 2012/0159912 | A1 * | 6/2012 | Ruppel | B01D 45/08 55/462 |
| 2012/0168361 | A1 * | 7/2012 | Motakef | B01D 46/0046 210/137 |
| 2012/0233973 | A1 * | 9/2012 | Sedillo | B01D 45/16 55/342.2 |
| 2013/0118357 | A1 | 5/2013 | Meusel et al. | |
| 2013/0213019 | A1 * | 8/2013 | Kruse | F01N 3/28 60/299 |
| 2014/0059800 | A1 * | 3/2014 | Bassett | A47L 9/0072 15/353 |
| 2014/0096683 | A1 * | 4/2014 | Azwell | B01D 46/2403 95/268 |
| 2014/0157737 | A1 * | 6/2014 | Schleiden | B01D 45/08 55/464 |
| 2014/0165513 | A1 * | 6/2014 | Oelpke | F02M 35/0216 55/385.1 |
| 2014/0283688 | A1 * | 9/2014 | Fogelman | B01D 46/003 95/281 |
| 2016/0032798 | A1 * | 2/2016 | Herman | B01D 45/08 95/268 |
| 2016/0108782 | A1 * | 4/2016 | An | F01M 13/04 123/573 |
| 2016/0186624 | A1 * | 6/2016 | Meusel | F01L 1/047 96/400 |
| 2017/0072352 | A1 | 3/2017 | Meister-Place | |
| 2018/0141058 | A1 | 5/2018 | Ortegren et al. | |

FOREIGN PATENT DOCUMENTS

| | | |
|---|---|---|
| JP | 2017025823 A | 2/2017 |
| WO | WO2005049176 A1 | 6/2005 |

* cited by examiner

OIL SEPARATOR INCLUDING SPIRAL MEMBERS DEFINING HELICAL FLOW PATHS

CROSS REFERENCE TO RELATED APPLICATIONS

This application claims the benefit of U.S. Provisional Patent Application Ser. No. 62/218,608 filed on Sep. 15, 2015, and titled "OIL SEPARATOR INCLUDING SPIRAL MEMBERS DEFINING HELICAL FLOW PATTERNS", the entire disclosure of which is hereby incorporated by reference.

TECHNICAL FIELD OF THE INVENTION

The present disclosure relates generally to oil separators for separating oil from oil-laden gases. More particularly, the present disclosure relates to an oil separator that includes a plurality of spiral members that each define a helical flow path for guiding the oil-laden gases therethrough to separate oil from the oil-laden gases.

BACKGROUND OF THE INVENTION

This section provides background information related to the present disclosure which is not necessarily prior art to the inventive concepts disclosed and claimed herein.

Internal combustion engines of vehicles, such as automobiles, typically include a combustion chamber where a fuel/air mixture is burned to cause movement of a set of reciprocating pistons, as well as a crankcase which contains the crankshaft driven by the pistons. During operation, it is normal for the engine to experience "blowby," wherein combustion gases leak past the pistons from the combustion chamber and into the crankcase. These combustion or blowby gases typically contain by-products of the combustion process including moisture, acids and an oil mist. Oil mist can further be generated as the result of moving components in the crankcase sloshing hot oil around. It is known for the oil mist to be carried by a crankcase ventilation system to the intake manifold of the internal combustion engine where it is then burned in the combustion chamber along with the fuel/air mixture. This often results in an undesirable increase in oil consumption.

To reduce the unnecessary consumption of oil, it is known to utilize cyclone-type oil separators to remove oil from the oil-laden blowby gases prior to entering the intake manifold. An example of such an oil separator is disclosed in U.S. Pat. No. 6,860,915 to Stegmaier et al. The oil separator includes a housing that defines a chamber. A partition assembly is disposed in the chamber and divides the chamber into an entry segment and an exit segment. The entry segment defines an inlet that extends into the chamber for receiving oil-laden gases from the crankcase, and the exit segment defines an outlet that extends into the chamber for expelling gases to the intake manifold. The partition assembly includes a channel that extends between a first opening in the entry segment and a second opening in the exit segment for passing the oil-laden gases between the entry and exit segments. A spiral member is disposed in the channel. The spiral member defines a helical flow path for guiding the oil-laden gases during passing of the oil-laden gases through the channel to separate the oil from the oil-laden gases. More specifically, small oil droplets pass and coalesce into larger droplets on the inner wall of the channel due to centrifugal forces created as the oil-laden gases pass through the helical flow path. The larger droplets are then directed by gravity to oil outlets and passed to a sump, which generally holds excess oil in the system.

To maximize the amount of oil that is separated by the helical flow path, it is desirable to maintain a relatively high velocity of the oil-laden gases passing therethrough while also providing a relatively large surface area of the inner walls of the channels for the oil to coalesce. Further, it is understood that the flow rate of the crankcase gas inside the helical flow path depends on the quantity of crankcase gas produced per unit time and on the flow cross-section of the flow path. The quantity of crankcase gas produced per unit time is largely related to the speed and load of the engine. To maximize oil separation efficiency, it is known to insert spiral members that have different cross-sectional areas into the channel to provide different flow cross-sections of the helical flow path depending on specific requirements. However, such a method does not actively adjust the effective flow cross-section of the helical flow path as the quantity of crankcase gas produced per unit time varies. Furthermore, prior art oil separators are known to create a high pressure drop between the inlet and outlets, which interferes with the drainage of separated oil. More specifically, the high pressure drop interferes with the force of gravity pulling separated oil particles toward the oil outlets.

In view of the above, there remains a continuing need to develop further improvements to oil separators. Particularly, it remains desirable to provide improved ways of maximizing separation efficiency of oil from the oil laden gases. It is also desirable to provide an oil separator that has a lower pressure loss between the inlet and outlet. It is further desirable to provide an oil separator that provides greater system flexibility over conventional oil separator designs.

SUMMARY OF THE INVENTION

This section provides a general summary of the disclosure and is not a comprehensive disclosure of its full scope or all of its aspects and features. The description and specific examples disclosed in this summary are not intended to limit the scope of the inventive concepts disclosed herein.

It is an aspect of the disclosure to provide an oil separator that provides a low pressure loss between the inlet and outlet of the oil separator per unit flow rate.

It is another aspect of the present disclosure to provide an oil separator that automatically adjust the size of the openings into the helical flow path to increase the average velocity of the oil-laden gases flowing therethrough to increase the separation efficiency of oil from the oil-laden gases at various flow rates.

It is another aspect of the disclosure to provide an oil separator that is simple in design, easy to manufacture and modular/scalable such that it may be used with numerous engine sizes and configurations.

In accordance with these and other aspects of the present disclosure, an oil separator is provided for separating oil from oil-laden gases, the oil separator includes a housing defining a chamber. A partition assembly is disposed in the chamber and divides the chamber into an entry segment and an exit segment. The entry segment defines an inlet that extends into the chamber for receiving oil-laden gases, and the exit segment defines an outlet that extends into the chamber for expelling gases. The partition assembly includes a plurality of channels that each extend between a first opening in the entry segment and a second opening in the exit segment for passing the oil-laden gases between the entry and exit segments. A plurality of spiral members are each disposed in one of the channels. Each of the spiral members defines a helical flow path for guiding the oil-laden gases in the helical flow path about the spiral member during passing of the oil-laden gases through the channels to separate the oil from the oil-laden gases.

According to another aspect of the disclosure, the oil separator can include at least one valve connected to at least one of the openings of the channels. The at least one valve is moveable between an open and closed position in response to a predetermined pressure being applied against the valve for maintaining the velocity of the oil-laden gases passing through the channels within a predetermined range.

According to a further aspect of the disclosure, the oil separator further includes a fine mist separator assembly that includes a fibrous pad disposed in the exit chamber adjacent to and in alignment with the second openings for absorbing oil in the oil-laden gases immediately after the oil-laden gases have passed through the helical flow path.

DRAWINGS

The drawings described herein are for illustrative purposes only of selected embodiments and are not intended to limit the scope of the present disclosure. Accordingly, the inventive concepts associated with the present disclosure will be more readily understood by reference to the following description in combination with the accompanying drawings, where.

DESCRIPTION OF THE EXEMPLARY EMBODIMENTS

Example embodiments will now be described more fully with reference to the accompanying drawings. Each of the example embodiments is directed to an oil separator for separating oil from oil-laden gases. The example embodiments only are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In general, the present disclosure is directed to one or more embodiments of an oil separator of the type well-suited for separating oil from oil-laden gases. The oil separator may be utilized to separate oil from gases of various devices such as, but not limited to, internal combustion engines of motor vehicles and refrigeration systems.

The oil separator of the present disclosure includes a housing defining a chamber. A partition assembly is disposed in the chamber and divides the chamber into an entry segment and an exit segment. The entry segment defines an inlet that extends into the chamber for receiving oil-laden gases, and the exit segment defines an outlet that extends into the chamber for expelling gases.

The partition assembly includes a plurality of channels that each extend between a first opening in the entry segment and a second opening in the exit segment for passing the oil-laden gases between the entry and exit segments. A plurality of spiral members are each disposed in one of the channels. Each of the spiral members define a helical flow path for guiding the oil-laden gases in the helical flow path about the spiral member during passing of the oil-laden gases through the channels to separate the oil from the oil-laden gases.

According to an aspect of the disclosure, at least one valve can be connected to at least one of the openings of the channels. The stated valve is moveable between an open and closed position in response to a predetermined pressure being applied against the valve for maintaining the velocity of the oil-laden gases passing through the channels within a predetermined range.

According to another aspect of the disclosure, the oil separator further includes a fine mist separator assembly that includes a fibrous pad disposed in the exit chamber adjacent to and in alignment with the second openings for absorbing oil in the oil-laden gases immediately after the oil-laden gases have passed through the frames.

Figure 1:
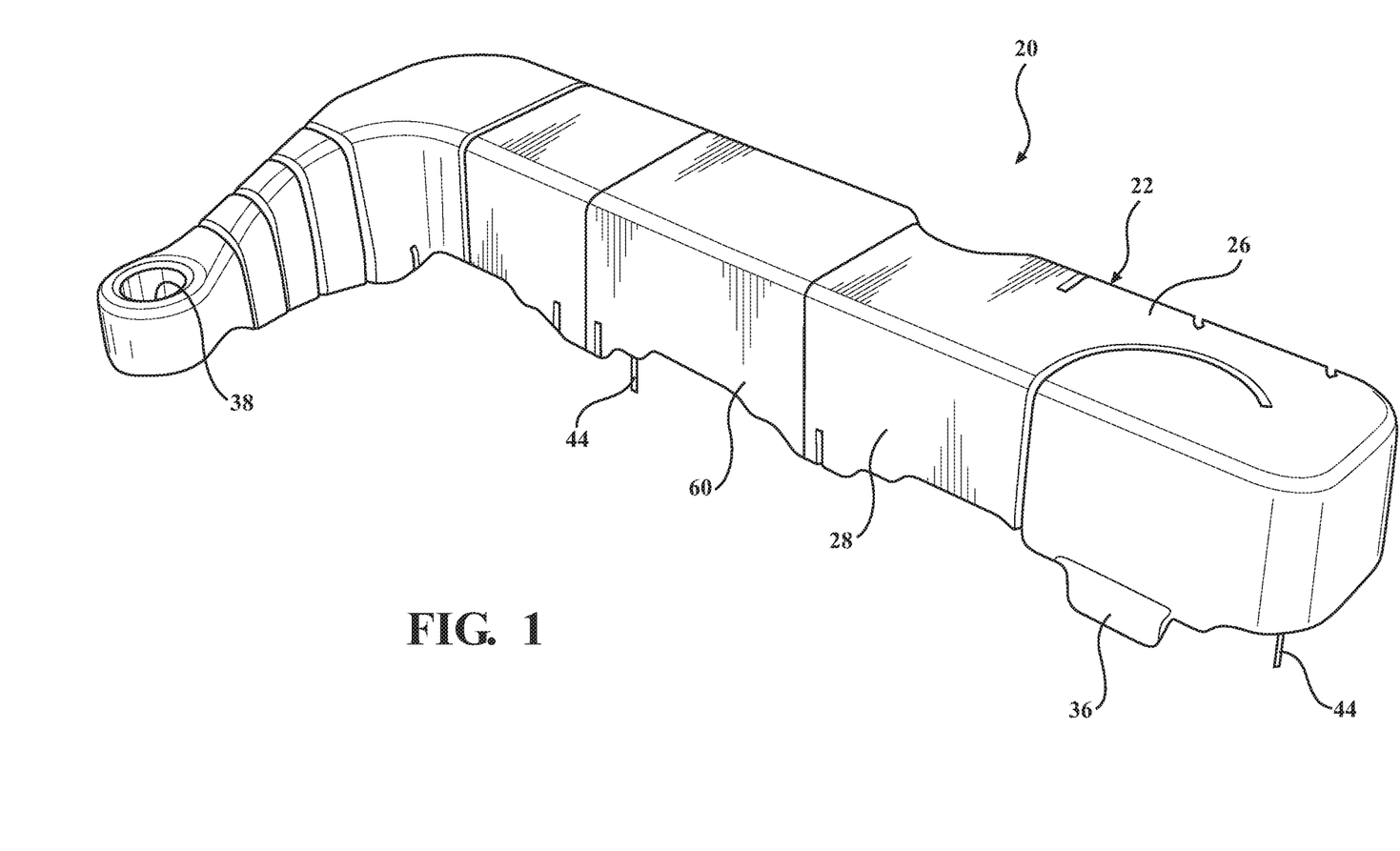
FIG. 1 is an isometric view of an oil separator according to an aspect of the disclosure.

With specific reference to the figures, an exemplary embodiment of an oil separator 20 is generally shown. The exemplary embodiment of the oil separator 20 is described in operable connection with an internal combustion engine of a vehicle, however, it should be appreciated that the oil separator 20 could also be connected to other systems, e.g., a refrigeration system. With specific reference to FIGS. 1 and 2, the oil separator 20 includes a housing 22 that has a base 24, a top 26 and a pair of sidewalls 28 and defines a chamber 30, 32. A partition assembly 34 is disposed in the chamber 30, 32 and divides the housing 22 into an entry segment 30 and an exit segment 32. The entry segment 30 defines an inlet 36 that extends into the chamber 30, 32 for receiving oil-laden gases from the crank-case of the combustion engine into the chamber 30, 32. The exit segment 32 defines a gas outlet 38 that extends into the chamber 30, 32 for expelling gases from the chamber 30, 32 to an air intake assembly of the combustion engine.

Figures 2, 3:
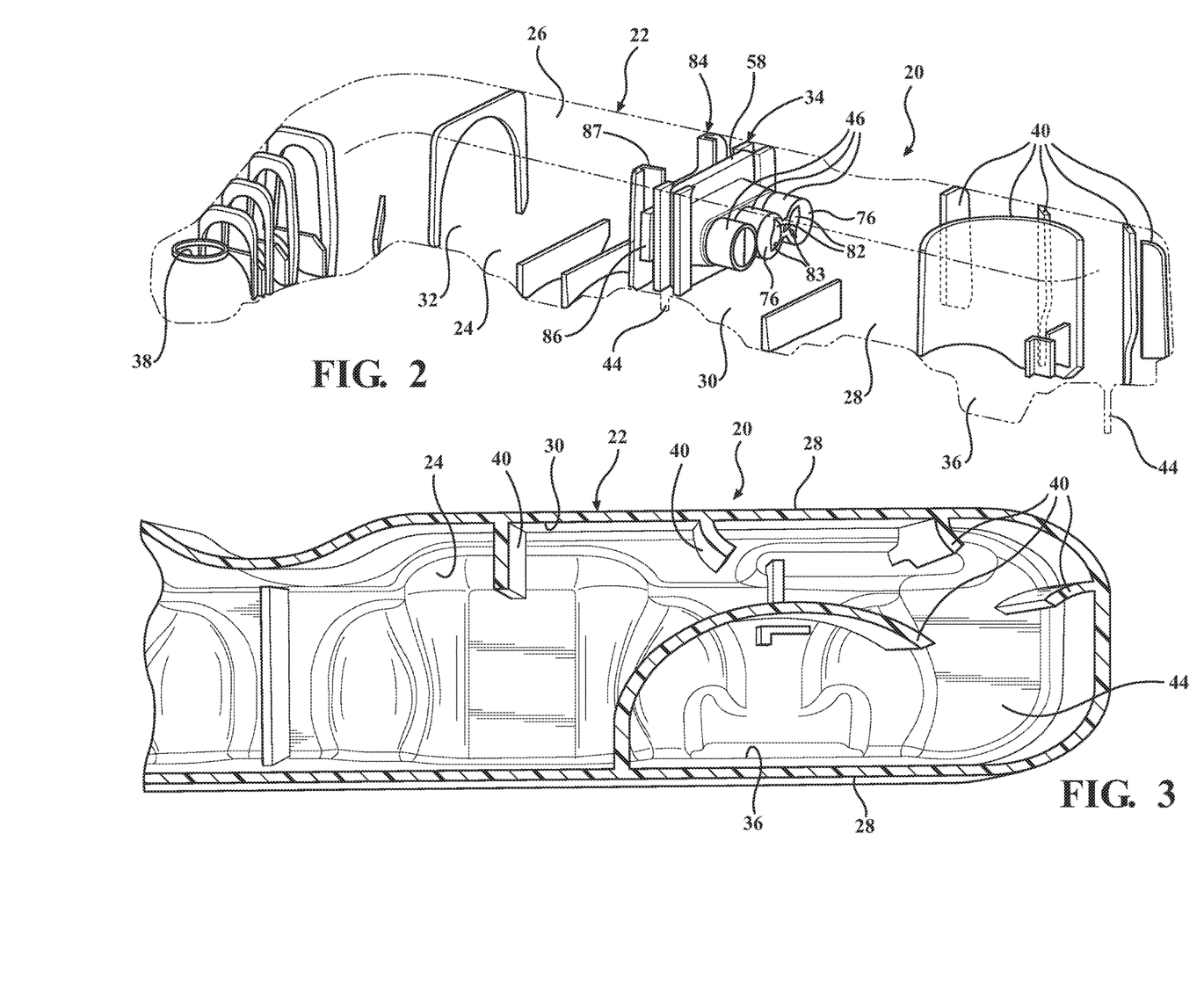
FIG. 2 is an isometric view of the oil separator of FIG. 1 wherein the outer walls of the housing are presented as being transparent.
FIG. 3 is a top cutaway view of the oil separator of FIG. 1 illustrating the inlet of the oil separator and a plurality of baffles.
Figure 4:
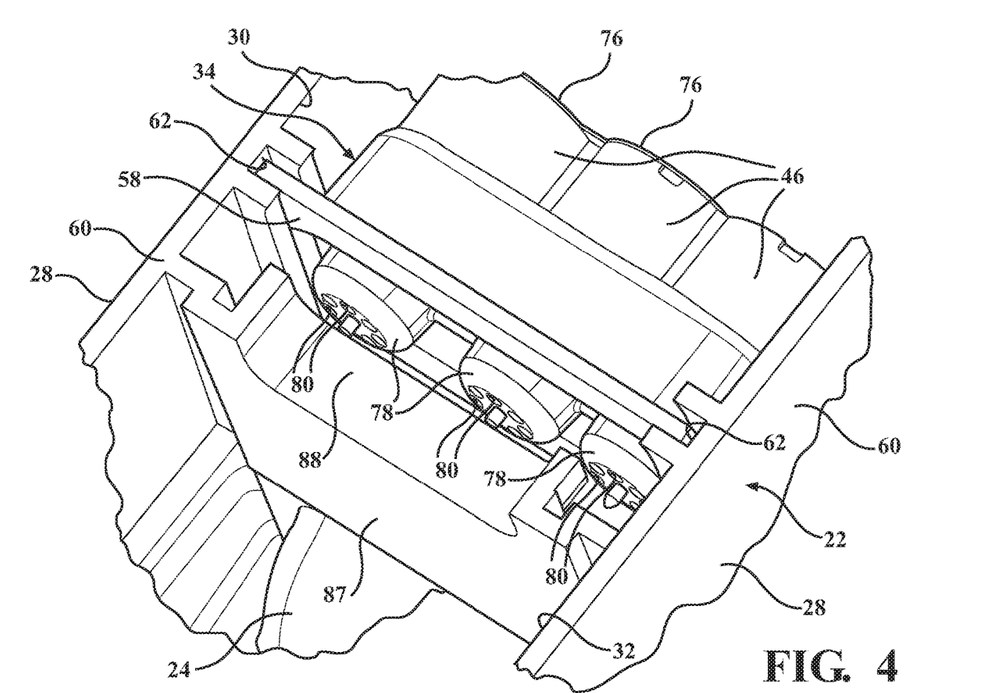
FIG. 4 is a perspective view of a partition assembly of the oil separator according to an aspect of the disclosure.
Figure 5:
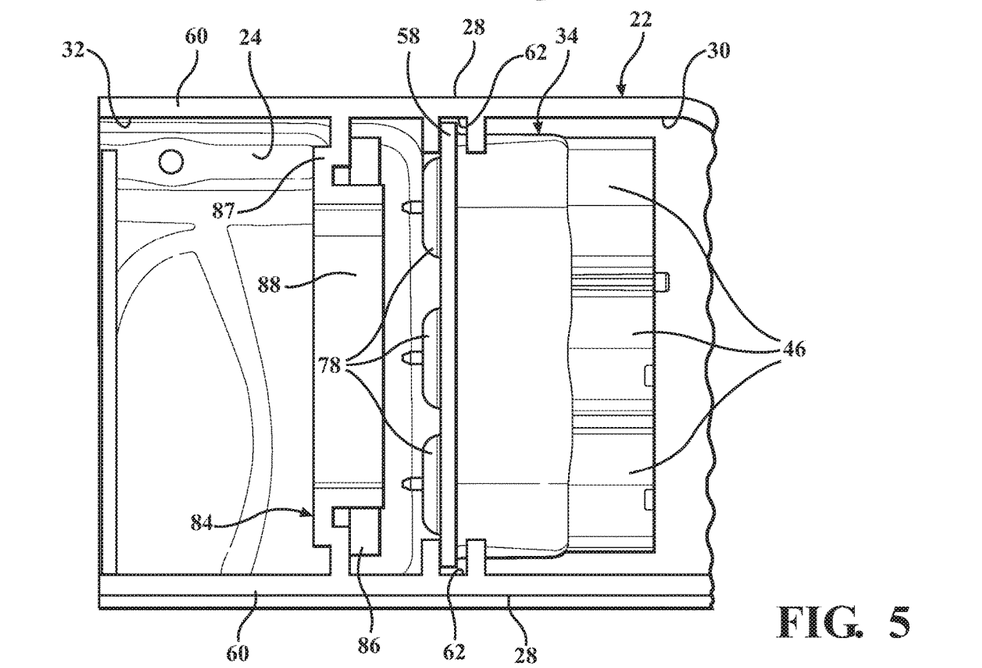
FIG. 5 is a top view of the partition assembly of FIG. 4.
Figure 6:
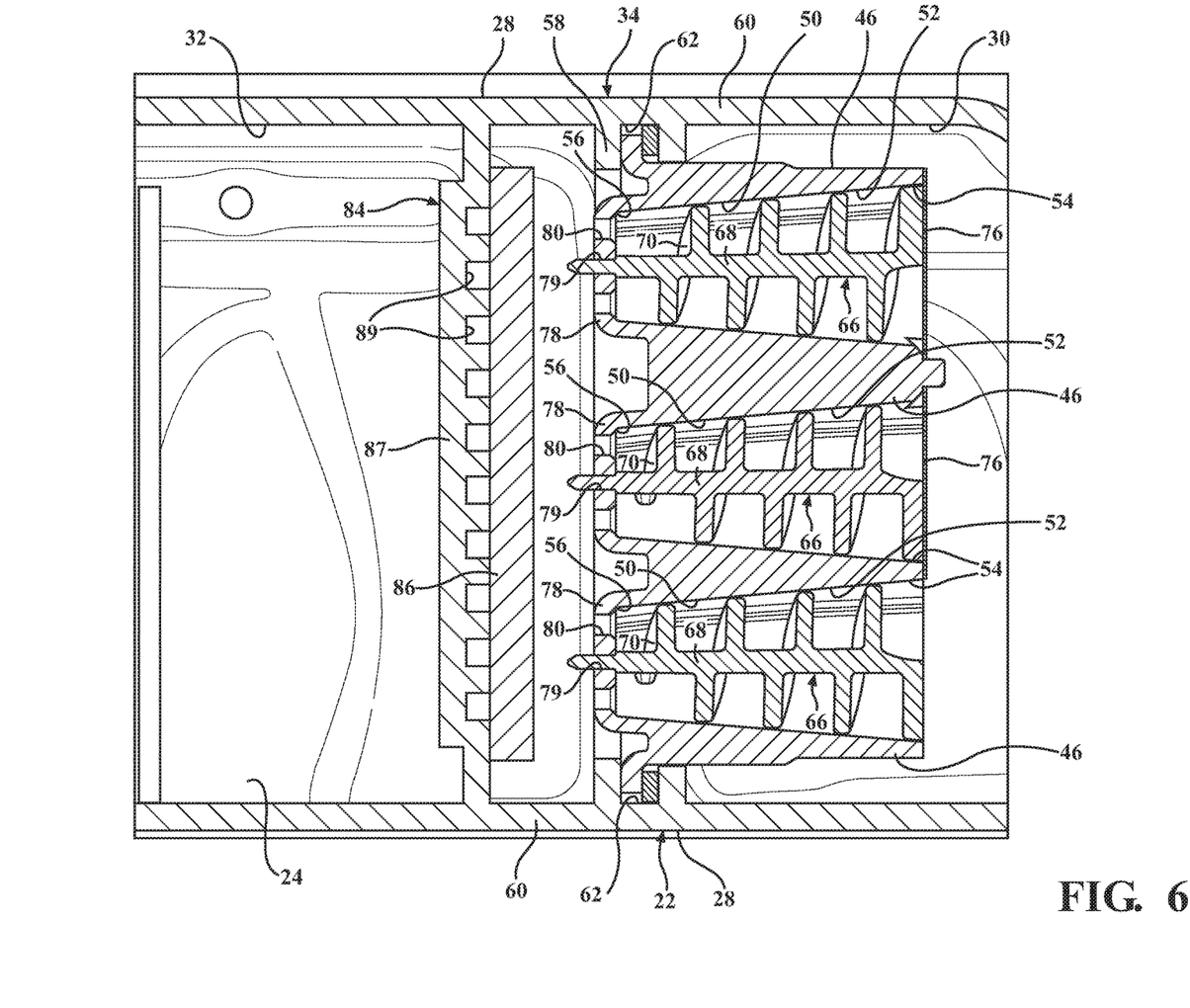
FIG. 6 is a front cutaway view of the partition assembly of FIG. 4 illustrating a configuration of a spiral member and valves.

A plurality of baffles 40 are disposed in the chamber 30, 32 in the entry segment 30 between the inlet 36 and the partition assembly 34. Each of the baffles 40 extend between the base 24 and the top 26 to define a labyrinth passage for guiding the oil-laden gases after the oil-laden gases have entered the chamber 30, 32 through the inlet 36. In operation, the baffles 40 separate the oil from the oil-laden gases during contact of the oil-laden gases with the baffles 40. At least one of the plurality of baffles 40 can be a "fish hook" style baffle that extends from the sidewall 28 in an arc shape over the inlet 36 which is particularly utilized to isolate splashing liquid oil that may be present during immediate entry of the oil-laden gases through the inlet 36. Further, at least one of the plurality of baffles 40 extends linearly from the sidewall 28. It should be appreciated that the shapes and positions of the baffles 40 provide for a swirling shape of the oil-laden gases passing through the labyrinth passage which aids in causing contact between oil particles and the baffles 40.

The base 24 of the housing 22 defines at least one oil outlet 44 in the chamber 30, 32 for expelling the oil that has been separated from the oil-laden gases of the crank-case into an oil pan of the combustion engine. In the exemplary embodiment, a plurality of oil outlets 44 are provided with at least one in each of the entry and exit segments 30, 32 of the chamber 30, 32, however, it should be appreciated that any number of oil outlets 44 could be defined along the base 24. It should further be appreciated that the base 24 may be sloped toward the oil outlets 44 to funnel the separated oil into the oil outlets 44.

As best presented in FIGS. 4-8, the partition assembly 34 includes a plurality of generally tapered tube-shaped frames 46 that extend in parallel relationship with one another. In the exemplary embodiment, three frames 46 are utilized, however, it should be appreciated that more or fewer could be used. Each of the frames 46 presents an outer surface and an inner surface 50. The inner surface 50 of each of the frames 46 defines a channel 52 that extends between a first opening 54 in the entry segment 30 and a second opening 56 in the exit segment 32 for passing the oil-laden gases between the entry segment 30 and the exit segment 32 after the oil laden gases have passed through the labyrinth passage 42. A connecting member 58 connects the plurality of frames 46 to one another and interconnects the frames 46 to the housing 22.

Each of the sidewalls 28 includes a modular segment 60 that is removeably connected to the base 24 and the remaining portion of the sidewall 28. The modular segments 60 extend in spaced and parallel relationship with one another. A pair of slots 62 are defined by opposing modular segments 60 of the sidewalls 28 in the chamber 30, 32 and in alignment with one another. The slots 62 each receive an edge of the connecting member 58 to position the frames 46 in place. It should be appreciated that the modular construction of the modular segments 60 and connecting member 58 provide for simple and fast manufacturing steps in assembling the modular segments 60 and connecting member 58.

As best presented in FIGS. 6-9, a plurality of spiral members 66 are each disposed in one of the channels 52 of each of the frames 46. Each of the spiral members 66 includes a shaft 68 and a flight 70. The shaft 68 extends between a proximal end disposed adjacent to the first opening 54, and a distal end disposed adjacent to the second opening 56. The flight 70 extends in a spiral shape about the shaft 68 and defines a helical flow path for guiding the oil-laden gases during passing of the oil-laden gases through the channels 52 to further separate the oil from the oil-laden gases during contact of the oil-laden gases with the frame 46. More specifically, centrifugal forces are produced as the oil-laden gases pass through the helical flow path, which forces small oil droplets to coalesce into larger droplets on the inner surface 50 of the frame 46. After the droplets have coalesced, gravity causes them to flow toward the oil outlets 44 in their liquid state.

Figure 8:
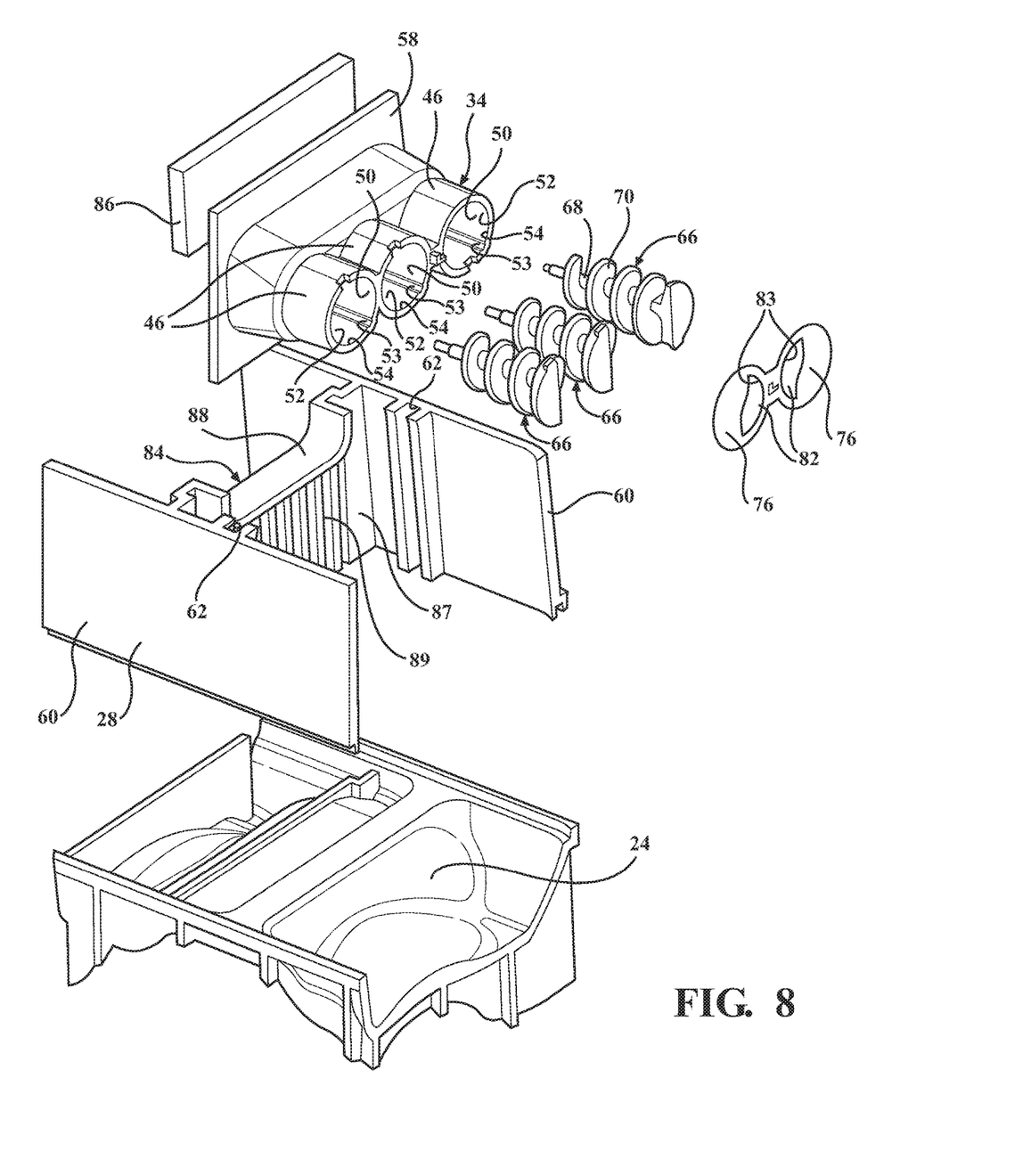
FIG. 8 is an exploded isometric view of the partition assembly of FIG. 4 illustrating a modular configuration of the partition assembly.

As best shown in FIG. 8, the inner surface 50 of each of the frames 46 defines an oil indentation 53 that extends linearly between the first opening 54 and the second opening 56 for passing the oil that has been separated from the oil-laden gases by the channel 52 axially toward the at least one oil outlet 44 in the entry segment 30 of the housing 22. Further, the frames 46 extend parallel to the base 24, and the inner surface 50 of each of the frames 46 has a generally frustoconical shape with the first opening 54 having a larger diameter than the second opening 56 for passing the oil that has been separated from the oil-laden gases at a downward angle via the oil indentation 53 into the entry segment 30 to further aid in removing separated oil from channels 52.

Figure 7:
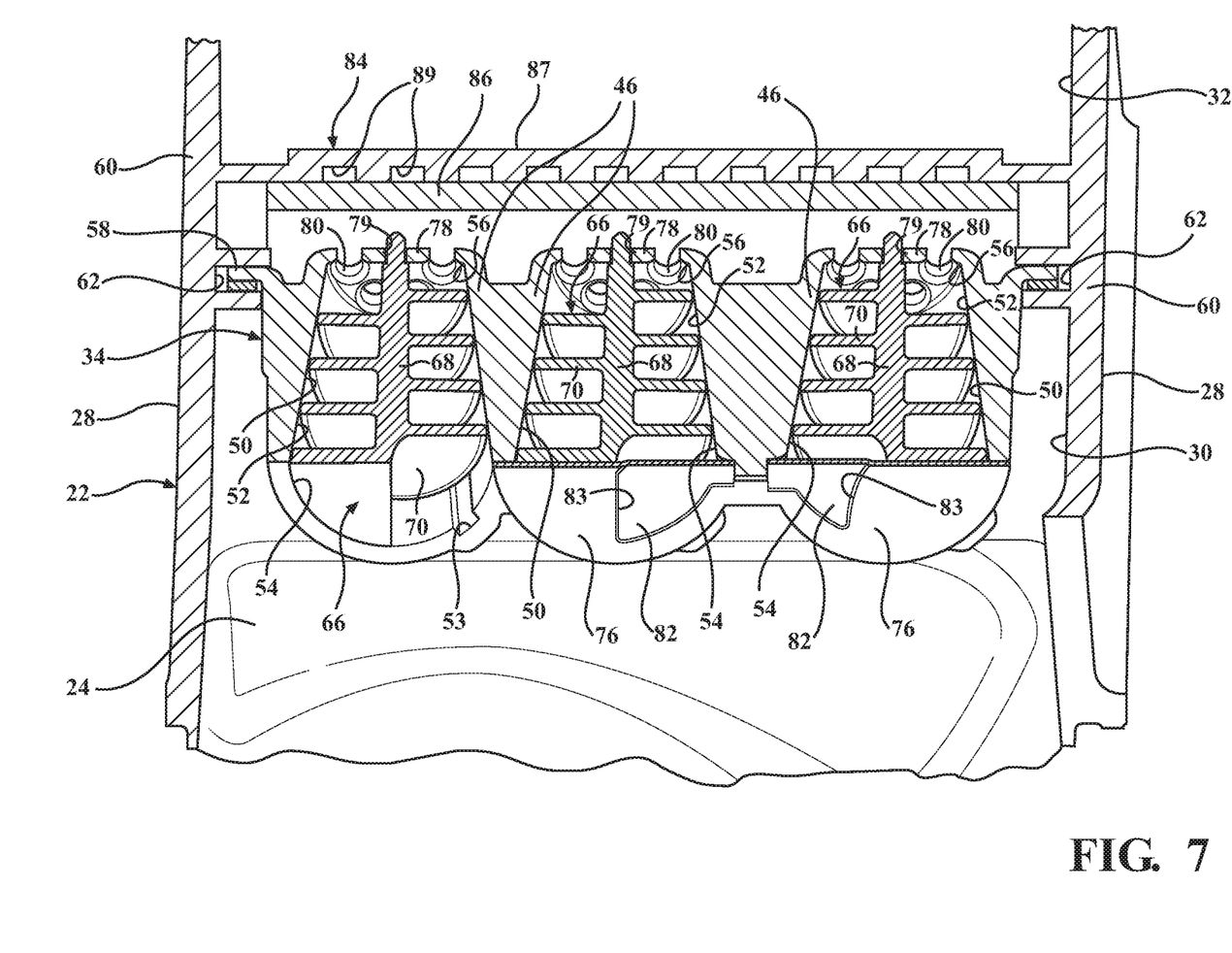
FIG. 7 is a front perspective view of the partition assembly of FIG. 4 illustrating a configuration of a spiral member and a first embodiment of valves and upstream plates.
Figure 9:
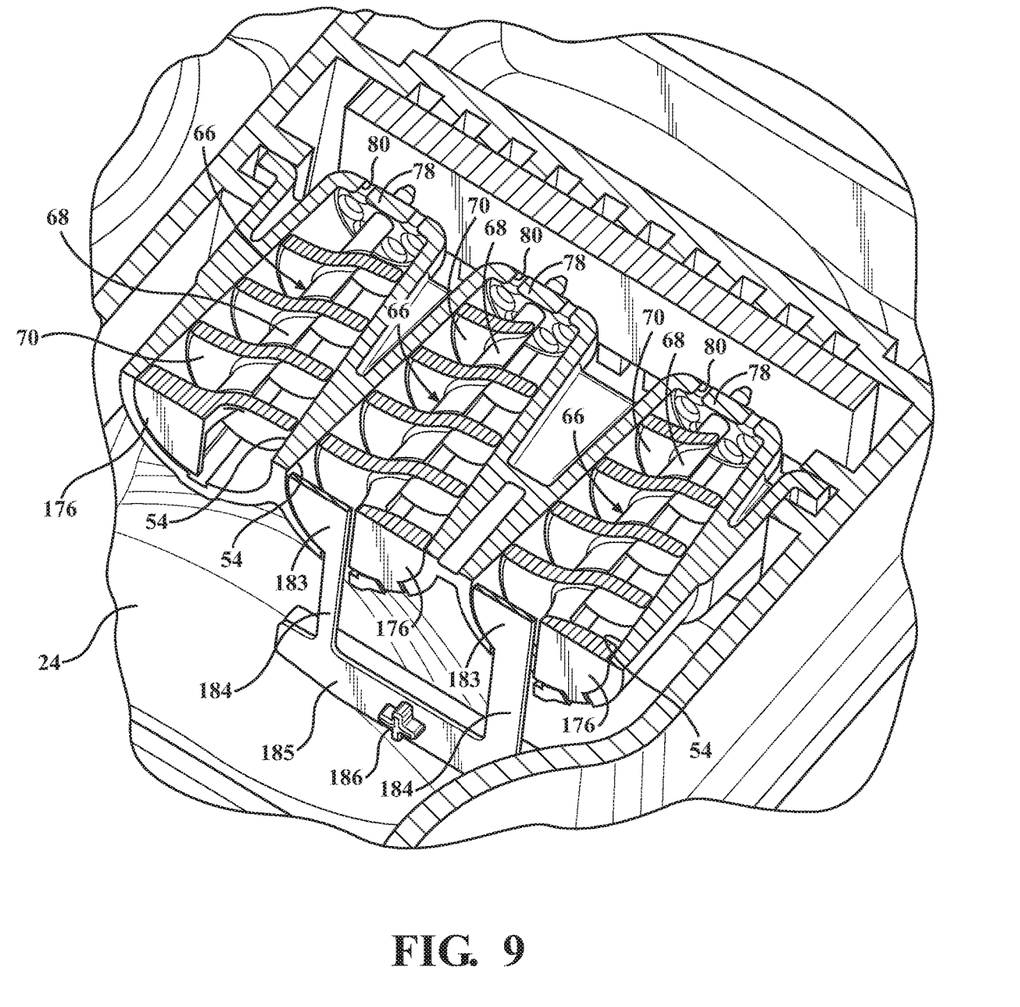
FIG. 9 is a perspective cutaway view of a partition assembly illustrating a second embodiment of valves and upstream plates.

As best presented in FIGS. 7-9, a plurality of upstream plates 76, 176 each cover over one of the first openings 54 of the frames 46 and a plurality of downstream plates 78 each cover over one of the second openings 56 of the frames 46. Each of the downstream plates 78 defines a central hole 79 that can receive the distal end of the shaft 68 of one of the spiral members 66 for securing the member to the downstream plates 78. It should be appreciated that the distal end of the shaft 68 could be connected to the downstream plates 78 in other ways. Each of the downstream plates 78 further defines a plurality of nozzle holes 80 that are disposed circumferentially about the center hole 79 for guiding the oil-laden gases therethrough after the oil-laden gases have passed through the helical path defined by the spiral member 66. It should be appreciated that the proximate location of the nozzle holes 80 near the end of the helical flow path causes the gases to flow through only a portion of the nozzles due to the shape of the flow path of the gases provided by the helical flow path. This causes the nozzle holes 80 to operate "artificially small", i.e., the area through which the gases pass through the nozzle holes 80 is smaller than the total area of the nozzle holes 80, thereby allowing the nozzle holes 80 to be formed with relatively large diameters. This advantageously reduces the pressure drop between the entrance and exit segments 30, 32 of the chamber 30, 32, allowing oil to more easily escape from the oil outlets 44.

At least one valve 82, 182 is connected to at least one of the openings 54, 56 of the channels 52. The valves 82, 182 are moveable between an open and closed position in response to a predetermined pressure being applied against the valve 82, 182. The predetermined pressure is provided as a result of the pressure difference between the entrance and exit segments 30, 32 of the chamber 30, 32, which correlates with the quantity of crankcase gases produced per unit time. To maximize the amount of oil that is separated by the helical flow path, it is desirable to maintain a relatively high velocity of the oil-laden gases passing therethrough while optimizing the surface of area of the inner walls of the channels 52 that the gases are exposed to, thereby increasing the amount of oil that coalesces against the inner surface 50 of the frame 46. It is understood that the flow rate of the oil-laden gases inside the helical flow path depends on the quantity of the oil-laden gases produced by unit time by the engine per unit time and on the flow cross-section of the helical flow path. Thus, the moveable valves 82, 182 ensure that the gases flow through the channels 52 within a predetermined velocity range as the quantity of the oil-laden gases produced per unit time varies. More specifically, when the quantity of oil-laden gases decreases, the valves 82, 182 are biased closed, and when the quantity of oil-laden gases increases, the valves 82, 182 are forced open.

In the exemplary embodiments, two valves 82, 182 are provided, each over one of the first openings 54, thereby leaving one of the first openings 54 open at all times. It should be appreciated that more or fewer valves 82, 182 could be utilized. The plurality of valves 82, 182 are each biased in a closed position, and moveable to an open position for opening the first opening 54 in response the predetermined pressure being applied. More specifically, the valves 82, 182 move inwardly in response to the predetermined pressures being applied. In order to provide the inward bending movement, the valves 82 could be made of various flexible materials or could be biased shut by way of one or more biasing mechanisms, including, but not limited to, a spring.

According to a first embodiment of the upstream plates 76 and valves 82 best illustrated in FIGS. 7 and 8, each of the upstream plates 76 defines a mouth 83 that extends into the channel 52. The plurality of valves 82 are each flexibly and pivotally connected to one of the upstream plates 76 along an edge of each of the valves 82. The valves 82 each overlie one of the mouths 83 and are shaped and sized substantially the same as the mouth 83 which they overlie such that they close the mouths 83 while in the closed position and may flex into the channel 52 toward the open position in response to the predetermined pressure being applied.

Figure 10:
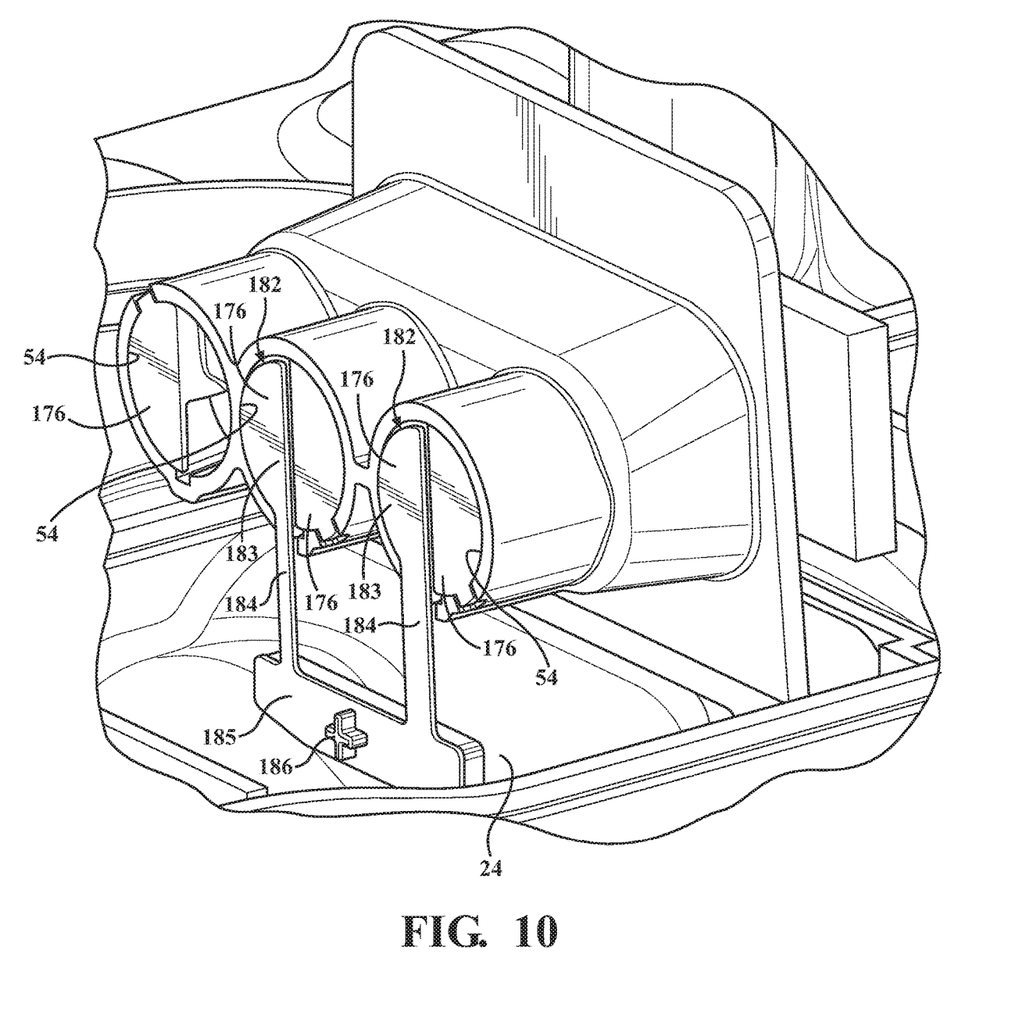
FIG. 10 is a perspective view of the partition assembly of FIG. 9 further illustrating the second embodiment of valves and upstream plates.

According to a second embodiment of the upstream plates 176 and valves 182 illustrated in FIGS. 9 and 10, the upstream plates 176 are each integrally part of one of the spiral members 70. Furthermore, a mouth 183 into the opening 54 is defined between each of the upstream plates 176 and the inner surface 50 of the frame 46. The plurality of valves 182 each have a face portion 183 that is shaped substantially the same as a mouth 183 which they overlie such that they close the mouth 183 while in the closed position. Each of the valves 182 further includes a neck portion 184 that extends downwardly from the face portion 183. The neck portions 184 are each connected to a cross-member portion 185 that extends generally transversely to the neck portion 184 and interconnects the neck portions 184. The neck portion 184 of each of the valves 182 is flexibly and pivotally connected to the cross-member portion 185 such that the neck portion 184 may move into the channel 52 toward the open position in response to the predetermined pressure being applied. A fastener 186 connects the cross-member portion 185 to the base 24 of the housing 22. It should be appreciated that various types of fasteners may be utilized including, but not limited to, bolts and screws. Furthermore, the width, thickness and material of the neck portions 184 may vary to adjust the pressure required to move the neck portions 184 to open the channels 52.

As illustrated in the figures, each mouth 83, 183 is sized differently than the mouths 83, 183 positioned adjacent thereto such that opening the valves 82, 182 may be staged depending on the quantity of crankcase gasses produced per unit time, thereby optimizing the separation efficiency of the oil separator 20. It is understood that separated efficiency means the amount of oil that is extracted from the oil-laden gasses. Therefore, the valves 82, 182 may be opened to complement the helical flow path that corresponds with the first opening 54 that is always opened. Varying the predetermined pressure may be accomplished by constructing the valves 82, 182 of flexible materials that have different spring constants from one another or utilizing springs that have different spring constants.

As best presented in FIGS. 2 and 4-8, a fine mist separator assembly 84 is disposed in the exit chamber 30, 32 for further separating oil from the oil-laden gases after the oil-laden gases have passed through the frames 46. The fine mist separator assembly 84 includes a generally rectangular-shaped fibrous pad 86 that is porous and disposed adjacent to and in alignment with the second openings 56 of the frames 46 for further absorbing oil in the oil-laden gases to further separate oil from the oil-laden gases. In the exemplary embodiment, the fibrous pad 86 is made of an unwoven nylon felt material, however, it should be appreciated that other materials could be utilized without departing from the scope of the subject disclosure. Additionally, the fibrous pad 86 could have other shapes, e.g., a triangular shape.

The fine mist separator assembly 84 also includes a generally rectangular-shaped impactor wall 87 that is disposed adjacent to the fibrous pad 86 between the sidewalls 28. The impactor wall 87 defines a plurality of indentations 89 that extend downwardly toward the base 24 for further separating the oil from the oil-laden gases during contact of the oil-laden gases with the impactor wall 87, and for directing the separated oil toward the base 24. The impactor wall 87 extends between the modular segments 60 of the sidewalls 28. The impactor wall 87 also includes a flange 88 that extends parallel to the base 24 over the fibrous pad 86 for limiting upward movement of the fibrous pad 86 to secure the fibrous pad 86 adjacent to the second openings 56. During operation, oil particles are separated from the gasses by the impactor wall 87 and are directed downwardly by the indentations 89. Meanwhile, "clean" gases pass over the flange 88 into the exit segment 32 of the chamber 30, 32 toward the gas outlets 38. It should be appreciated that the fine mist separator assembly 84 could be configured without the fibrous pad 86, causing the oil-laden gases to collide with the impactor wall 87 without passing through the fibrous pad 86.

According to an aspect of the disclosure, one or more passages could be defined by the partition assembly for allowing oil that has been separated by the fibrous pad 86 and/or impactor wall 87 to pass between the entry and exit segments 30, 32 of the chamber 30, 32. The passages could be defined between the base 24 and sidewalls 28.

A plurality of lower walls 90 extend upwardly from the base 24 in the entry and exit segments 30, 32 for further separating oil from the oil-laden gases during contact of the oil-laden gases with the lower walls 90, and to limit the velocity of the oil-laden gases moving adjacent to the base 24. Each of the lower walls 90 extend between the sidewalls 28 and are spaced from the top 26. Furthermore, a plurality of arches 92 are disposed in the exit segment 32 near the outlet 38 for further separating oil from the oil-laden gases during contact of the oil-laden gases with the arches 92 and to limit the velocity of the oil-laden gases moving adjacent to the top 26. Thus, the lower walls 90 and arches 92 each provide for a "dead area" in their respective segments 30, 32 of the chamber 30, 32 that promotes settling of the oil-laden gases to allow separated oil to drain through the oil outlets 44.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. An oil separator for separating oil from oil-laden gases, said oil separator comprising:
   a housing defining a chamber;
   a partition assembly disposed in said chamber and dividing said chamber into an entry segment and an exit segment;
   said entry segment defining an inlet extending into said chamber for receiving oil-laden gases and said exit segment defining an outlet extending into said chamber for expelling gases;
   said partition assembly including a plurality of channels each extending between a first opening in said entry segment and a second opening in said exit segment for passing the oil-laden gases between said entry and exit segments; and
   a plurality of spiral members each disposed in one of said channels and defining a helical flow path for guiding the oil-laden gases in said helical flow path about said spiral member during passing of the oil-laden gases through said channels to separate the oil from the oil-laden gases;
   wherein each of said spiral members includes a shaft and a flight with said shaft extending between a proximal end adjacent to one of said first openings and a distal end adjacent to one of said second openings and wherein said flight extends in a spiral shape about said shaft to define said helical flow path;
   a plurality of downstream plates each disposed over one of said second openings, and each of said downstream plates defining a central hole receiving said distal end of one of said shafts of one of said spiral members for securing said spiral members to said downstream plates.

2. An oil separator as set forth in claim 1 wherein each of said downstream plates further defines a plurality of nozzle holes disposed about said center indentation for guiding the oil-laden gases therethrough after the oil-laden gases have passed through said helical flow path.

3. An oil separator as set forth in claim 1 further including a fine mist separator assembly including a fibrous pad disposed in said exit chamber adjacent to and in alignment with said second openings for absorbing oil in the oil-laden gases immediately after the oil-laden gases have passed through said helical flow path.

4. An oil separator as set forth in claim 3 wherein said fine mist separator assembly further includes an impactor wall disposed adjacent to said fibrous pad and defining a plurality of indentations extending downwardly for further separating oil from the oil-laden gases during contact of the oil-laden gases with said impactor wall and for directing the separated oil downwardly along said indentations after the separated oil has passed through said fibrous pad.

5. An oil separator as set forth in claim 1 wherein said partition assembly includes a plurality of frames extending between said entry and exit segments and wherein each of said frames has an inner surface defining one of said channels.

6. An oil separator as set forth in claim 5 wherein each of said frames defines an oil indentation extending between said first opening and said second opening for passing oil that has been separated from the oil-laden gases by said channel out of said channel.

7. An oil separator as set forth in claim 6 wherein said inner surface of each of said frames has a generally frusto-conical shape with said first opening having a larger diameter than said second opening for passing the oil that has been separated from the oil-laden gases at a downward angle into said entry segment.

8. An oil separator as set forth in claim 1 further including at least one valve connected to at least one of said openings of said channels and moveable between an open and closed position in response to a predetermined pressure being applied against said valve for maintaining the velocity of the oil-laden gases passing through the said channels within a predetermined range.

9. An oil separator as set forth in claim 8 wherein said at least one valve includes a plurality of valves and said predetermined pressure is different for each of said valves.

10. An oil separator as set forth in claim 9 further including a plurality of upstream plates each covering one of said first openings, each of said upstream plates defining a mouth extending into said channel, and said plurality of valves each flexibly connected to one of said upstream plates over one of said mouths for opening and closing said mouths in response to said predetermined pressure being applied.

11. An oil separator as set forth in claim 9 wherein each of said valves includes a face portion and a neck portion, wherein said face portion overlies said first opening and said neck portion extends downwardly from said face portion, and wherein said neck portion is moveable relative to said housing to move said face portion into said channel toward said open position in response to the predetermined pressure being applied.

12. An oil separator as set forth in claim 11 wherein each of said spiral members defines an upstream plate in said first opening, wherein said upstream plate partially closes said first opening to define a mouth between said upstream plate and a wall of said channel, and wherein said face portion of each of said valves is shaped substantially the same as said mouth such that said face portion closes said mouth while in said closed position.

13. An oil separator as set forth in claim 11 wherein said neck portions of said valves are connected to a cross-member portion, and wherein a fastener connects said cross-member portion to said housing.

14. An oil separator for separating oil from oil-laden gases, said oil separator comprising:
   a housing defining a chamber;
   a partition assembly disposed in said chamber and dividing said chamber into an entry segment and an exit segment;
   said entry segment defining an inlet extending into said chamber for receiving oil-laden gases and said exit segment defining an outlet extending into said chamber for expelling gases;
   said partition assembly including a plurality of channels each extending between a first opening in said entry segment and a second opening in said exit segment for passing the oil-laden gases between said entry and exit segments;
   a plurality of spiral members each disposed in one of said channels and defining a helical flow path for guiding the oil-laden gases in said helical flow path about said spiral member during passing of the oil-laden gases through said channels to separate the oil from the oil-laden gases; and
   a fine mist separator assembly including a fibrous pad disposed in said exit segment of said chamber adjacent to and in alignment with said second openings for absorbing oil in the oil-laden gases immediately after the oil-laden gases have passed through said helical flow path;

wherein said fine mist separator assembly further includes an impactor wall disposed adjacent to said fibrous pad and defining a plurality of indentations extending downwardly for further separating oil from the oil-laden gases during contact of the oil-laden gases with said impactor wall and for directing the separated oil downwardly along said indentations after the separated oil has passed through said fibrous pad;

wherein said housing further includes a pair of sidewalls, each of said sidewalls includes a modular segment removably connected to the remaining portion of said sidewalls, and said impactor wall extends between said modular segments.

15. An oil separator as set forth in claim 14 wherein said impactor wall includes a flange extending over said fibrous pad for limiting upward movement of said fibrous pad to secure said fibrous pad adjacent to said second frames.

16. An oil separator as set forth in claim 14 wherein said fine mist separator assembly further includes a connecting member connecting said plurality of frames to one another and interconnecting said frames to said housing, and a pair of slots are defined by said modular segments of said sidewalls and in alignment with one another and receive said connecting member to position said frames adjacent to said impactor wall.

17. An oil separator for separating oil from oil-laden gases, said oil separator comprising:

a housing defining a chamber;

a partition assembly disposed in said chamber and dividing said chamber into an entry segment and an exit segment;

said entry segment defining an inlet extending into said chamber for receiving oil-laden gases and said exit segment defining an outlet extending into said chamber for expelling gases;

said partition assembly including a plurality of channels each extending between a first opening in said entry segment and a second opening in said exit segment for passing the oil-laden gases between said entry and exit segments;

a plurality of spiral members each disposed in one of said channels and defining a helical flow path for guiding the oil-laden gases in said helical flow path about said spiral member during passing of the oil-laden gases through said channels to separate the oil from the oil-laden gases, said spiral members each including a shaft and a flight extending in a spiral shape from said shaft to define said helical flow path, said shaft extending between a proximal end located adjacent to one of said first openings and a distal end located adjacent to one of said second openings;

a plurality of downstream plates each disposed over one of said second openings and to which said distal end of one of said shaft is secured, said downstream plates including a plurality of nozzle holes for guiding the oil-laden gases therethrough after the oil-laden gases have passed through said helical flow path; and at least one valve connected to at least one of said openings of said channels and moveable between an open and closed position in response to a predetermined pressure being applied directly to said valve for maintaining the velocity of the oil-laden gases passing through said channels within a predetermined range.

18. An oil separator as set forth in claim 17 wherein said at least one valve includes a plurality of valves and said predetermined pressure is different for each of said valves.

19. An oil separator as set forth in claim 18 further including a plurality of upstream plates each covering one of said first openings, each of said upstream plates defining a mouth extending into said channel, and said plurality of valves each flexibly connected to one of said upstream plates over one of said mouths for opening and closing said mouths in response to said predetermined pressure being applied.

20. An oil separator as set forth in claim 17 wherein said least one valve is pivotable between an open and closed position in response to a predetermined pressure being applied against said valve for maintaining the velocity of the oil-laden gases passing through said channels within a predetermined range.

* * * * *